(12) United States Patent
Bergmann et al.

(10) Patent No.: US 8,939,124 B2
(45) Date of Patent: Jan. 27, 2015

(54) BALANCING SHAFT WITH BEARING POINT HAVING SEPARATED FIRST AND SECOND BEARING SURFACES

(71) Applicant: Mahle International GmbH, Stuttgart (DE)

(72) Inventors: Christoph Bergmann, Markkleeberg (DE); Berthold Repgen, Plettenberg (DE); Markus Walch, Bretten (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 13/691,253

(22) Filed: Nov. 30, 2012

(65) Prior Publication Data

US 2013/0139779 A1 Jun. 6, 2013

(30) Foreign Application Priority Data

Dec. 1, 2011 (DE) .......................... 10 2011 087 535

(51) Int. Cl.
*F02B 75/06* (2006.01)
*F16F 15/26* (2006.01)

(52) U.S. Cl.
CPC ............... *F02B 75/06* (2013.01); *F16F 15/264* (2013.01)
USPC ..................................... 123/192.2; 123/192.1

(58) Field of Classification Search
CPC ........ F02B 75/06; F16F 15/264; F16F 15/267
USPC ....................... 123/192.1, 192.2; 74/603, 604
See application file for complete search history.

(56) References Cited

U.S. PATENT DOCUMENTS

| 6,305,339 | B1 * | 10/2001 | Iwata et al. ................. 123/192.2 |
| 6,371,071 | B1 * | 4/2002 | Iwata .......................... 123/192.2 |
| 6,854,358 | B1 * | 2/2005 | Stuckler .......................... 74/603 |
| 7,444,976 | B2 | 11/2008 | Hofheinz et al. |
| 7,628,133 | B2 * | 12/2009 | Tisch et al. ................. 123/192.2 |
| 8,312,855 | B2 * | 11/2012 | Mederer ..................... 123/192.2 |
| 8,375,916 | B2 * | 2/2013 | Tisch .......................... 123/192.2 |
| 8,413,631 | B2 * | 4/2013 | Herzog et al. ............. 123/192.2 |
| 2007/0177837 | A1 | 8/2007 | Tisch et al. |
| 2009/0308343 | A1 | 12/2009 | Herzog et al. |
| 2010/0199940 | A1 | 8/2010 | Tisch |
| 2011/0023809 | A1 * | 2/2011 | Solfrank ..................... 123/192.2 |
| 2011/0030643 | A1 * | 2/2011 | Tisch .......................... 123/192.2 |
| 2012/0125281 | A1 * | 5/2012 | Herzog et al. ............. 123/192.2 |

FOREIGN PATENT DOCUMENTS

DE 102007009800 A1 10/2007
DE 102007017873 A1 10/2008

(Continued)

OTHER PUBLICATIONS

European Search Report for EP12194347.6, dated Jan. 10, 2014.

*Primary Examiner* — Noah Kamen
*Assistant Examiner* — Grant Moubry
(74) *Attorney, Agent, or Firm* — Rader, Fishman & Grauer PLLC

(57) ABSTRACT

A balancing shaft may have at least one unbalance portion and at least one bearing point, wherein the at least one unbalance portion is associated with the at least one bearing point. The balancing shaft on the bearing point may define a transverse opening which separates a first part bearing surface from a second part bearing surface.

26 Claims, 3 Drawing Sheets

(56) References Cited

FOREIGN PATENT DOCUMENTS

| DE | 102007027989 A1 | 12/2008 |
|----|----|----|
| EP | 1081410 A1 | 3/2001 |
| EP | 1775484 A2 | 4/2007 |
| EP | 2017486 | 1/2009 |
| WO | WO-2007/121861 A1 | 11/2007 |
| WO | WO-2008/151723 A1 | 12/2008 |
| WO | WO-2009098005 A2 | 8/2009 |

* cited by examiner

BALANCING SHAFT WITH BEARING POINT HAVING SEPARATED FIRST AND SECOND BEARING SURFACES

CROSS-REFERENCE TO RELATED APPLICATION

This application claims priority to German Patent Application 10 2011 087 535.2, filed on Dec. 1, 2011, which is hereby incorporated by reference in its entirety.

TECHNICAL FIELD

The present invention relates to a balancing shaft for a combustion engine having at least one unbalance portion and at least one bearing point according to the preamble of the claim. The present invention additionally relates to a combustion engine having at least one such balancing shaft.

BACKGROUND

From WO 2007/121861 A1 a generic balancing shaft for a multi-cylinder engine having at least one unbalance portion and at least one bearing point is known, wherein the at least one unbalance portion is assigned to a bearing point. The bearing point per se has a radial running surface which extends only partially over a circumference of the bearing point, wherein a centrifugal force resulting upon rotation of the balancing shaft is located within a region of the bearing point that is formed through the running surface that is partially extending over the circumference of the bearing point. This is to create a balancing shaft which provides a reduction of the overall weight and the moved masses while maintaining the desired unbalance compensation in the case of multi-cylinder engines.

From WO 2008/151723 A1 a further generic balancing shaft is known, wherein the partially formed running surface is assigned a running ring segment which follows the partially formed running surface of the bearing point and forms a completely closed running surface with the latter. In addition, at least one lateral edge bounding the width of the running ring segment is provided, which spans the partially formed running surface and is of a self-supporting design. This, too, is to achieve a reduction of the total weight while maintaining the unbalance compensation.

Further balancing shafts are known for example from U.S. Pat. No. 7,444,976,B2, from EP 1 775 484 B1 and from EP 2 017 486 B1.

Disadvantageous with the known balancing shafts in particular is their elaborate and thus expensive production.

SUMMARY

The present invention therefore deals with the problem of stating an improved or at least an alternative embodiment for a balancing shaft of the generic type, which is characterized in particular by a rational and cost-effective production and a low weight at the same time.

According to the invention, this problem is solved through the subjects of the independent claims. Advantageous embodiments are subject of the dependent claims.

The present invention is based on the general idea of providing a transverse opening in the region of a bearing point of a balancing shaft, which on the one hand saves weight and on the other hand configures the bearing surface arranged in the region of the bearing point so that the balancing shaft according to the invention can be easily forged with conventional forging tools and because of this can be produced in a simple and cost-effective manner. The forging device for the balancing shaft according to the invention is selected so that the mass distribution in the upper die and lower die is (almost) the same. This is a substantial difference from the previous forging. The advantage of the balancing shaft according to the invention is its more economical production (even die where, improved flow condition etc.). The transverse opening in this case separates a first part bearing surface partially extending over a circumference of the bearing point from a second part bearing surface likewise partially extending over the circumference and divides the two part bearing surfaces in such a manner that the entire balancing shaft can be forged in a corresponding die and with a corresponding forging die can be forged in a single forging step. In particular, the balancing shaft configured in such a manner has no undercut profiles running in forging direction which render a forging of the shaft impossible per se. With the balancing shaft according to the invention, several significant advantages are thus achieved simultaneously, namely on the one hand the balancing shaft can be lighter per se and the moved masses thus reduced and on the other hand the balancing shaft according to the invention can be additionally produced simply, precisely and additionally cost-effectively.

In the case of an advantageous further development of the solution according to the invention, the balancing shaft is forged and the transverse opening runs parallel to the forging direction. Producing the balancing shaft according to the invention can thus take place for example in a die forging process, wherein a suitably shaped forging die presses the forging material to be formed into the associated die. The passage opening in this case makes possible in particular a transverse displacing of the material to be forged, as a result of which in particular the part bearing surfaces are easy to forge.

In the case of an advantageous further development of the solution according to the invention, the second part bearing surface is shorter in axial direction, i.e. designed narrower seen in transverse direction of the balancing shaft than the first part bearing surface. The different-size part bearing surfaces in this case result from different load cases, since the second part bearing surface is assigned a significantly lower unbalance weight than the first part bearing surface. The area loading of the individual part bearing surfaces is thus preferentially the same because of the different size of the two part bearing surfaces and the different unbalance weights assigned in each case. The two part bearing surfaces are thus matched to the respective loading to be absorbed. Through the different widths of the part bearing surfaces, a significantly improved lubrication of the rolling bearings provided in the region of the part bearing surfaces, for example needle bearings, can be effected, as a result of which the balancing shaft per se can be mounted easily and thus in an energy-saving manner.

In the case of an advantageous further development of the solution according to the invention, the transverse opening is arranged outside the axial middle of the balancing shaft. This makes possible assigning the first part bearing surface a comparatively large unbalance weight, whereas the second and smaller part bearing surface because of the off-centre transverse opening is assigned a significantly lower unbalance weight. The balancing shaft according to the invention thus has corresponding unbalance weights in the region of the bearing points themselves, through which neighbouring unbalance portions can be reduced with respect to their weight.

In the case of an advantageous further development of the solution according to the invention, the second part bearing surface is held by two webs axially spaced from each other, each of which form a margin of the transverse opening. Here, the transverse opening can be designed rectangular, triangular or trapezium-shaped. This—non-conclusive—enumeration already shows that the configuration of the transverse opening can be freely selected almost randomly and because of this, individually adapted to respective loadings that occur. The transverse openings themselves usually have a same continuous cross section in order to be able to move in and out again with a corresponding associated forging die.

Practically, the balancing shaft comprises a steady rest application portion. Such a bulging steady rest application portion can be provided—but not necessarily so—and is usually only provided when in this region an avoiding of the balancing shaft relative to a connecting rod is required. Such a steady rest application portion additionally makes possible a holding of the balancing shaft in addition to the two end regions during a reworking of these that may be required under certain conditions. Through the bulging steady rest application portion a distribution of the unbalance weights is additionally possible. A transition from the steady rest application portion to the unbalance portions or the bearing points in this case is preferentially configured merging into one another in a flowing manner.

Further important features and advantages of the device according to the invention are obtained from the subclaims, from the drawings and from the associated Figure description by means of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description.

BRIEF DESCRIPTION OF THE DRAWINGS

There it shows, in each case schematically.

DETAILED DESCRIPTION

Figure 1:
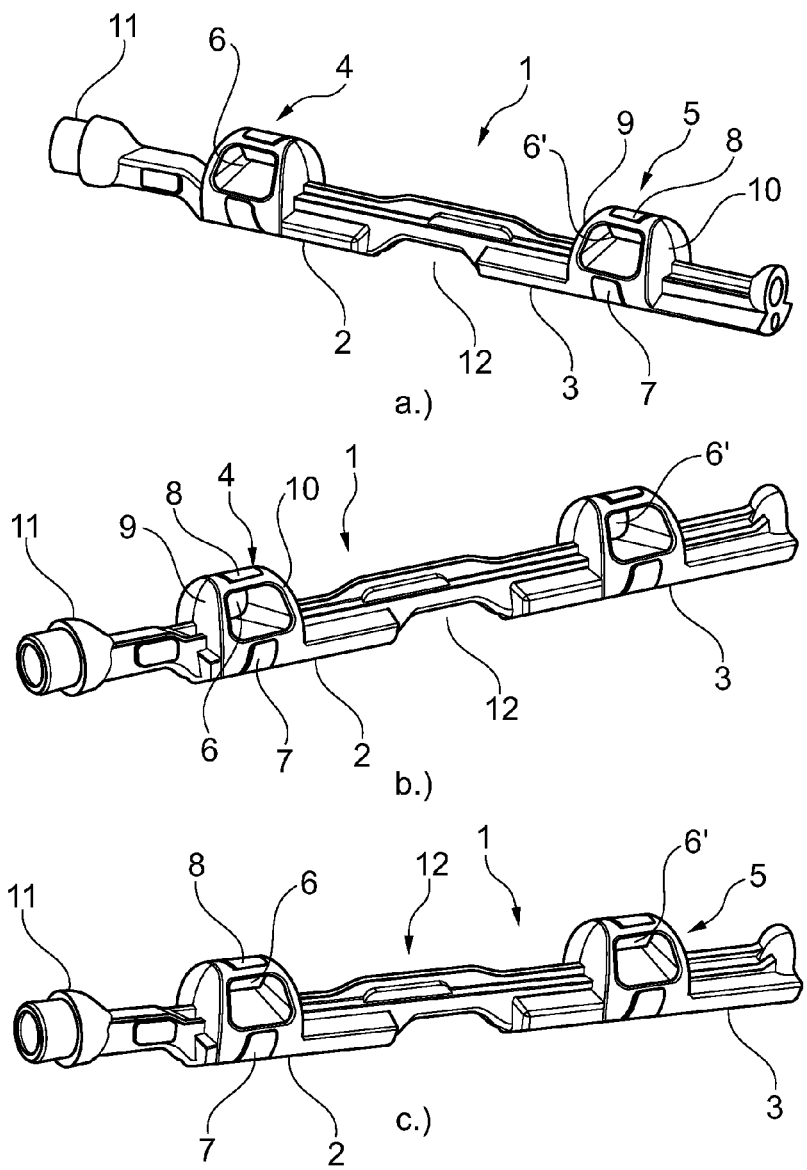
FIG. 1a-c in each case, similar balancing shafts according to the invention with trapezium-shaped transverse openings provided in the region of the bearing points, FIG. 2a, b further possible embodiments of the balancing shafts according to the invention with triangular transverse openings in the region of the bearing points, FIG. 3a, b similar shafts as in FIGS. 1a, b and c, however each with slight modifications, FIG. 4 a further possible embodiment of the balancing shaft according to the invention, FIGS. 5a, b and c alternative embodiments of balancing shafts not subject to the invention.

According to the FIGS. 1 to 4, a balancing shaft 1 for a combustion engine which is not shown according to the invention comprises several unbalance portions 2, 3 and two bearing points 4, 5 each, wherein each bearing point 4, 5 is assigned at least one unbalance portion 2, 3. According to the invention, the balancing shaft 1 now has a transverse opening 6, 6' on the bearing point 4, 5, which separates a first part bearing surface 7 from a second part bearing surface 8. The transverse openings 6, 6' provided according to the invention in this case offer several significant advantages: on the one hand, they reduce the weight in the region of the bearing point 4, 5, as a result of which the balancing shaft 1 altogether can be designed lighter and because of this, operated in a more energy-saving manner. On the other hand, the transverse openings 6, 6' make possible a forging of the balancing shaft 1 by means of a conventional die and an associated forging die, as a result of which the balancing shaft 1 cannot only be produced precisely but also comparatively costs-effectively. The transverse openings 6, 6' in this case usually run parallel to a forging direction.

According to the FIGS. 1 to 4, two transverse openings 6, 6' each are assigned to the respective shown balancing shaft 1, wherein it is obviously also conceivable that the balancing shaft 1 according to the invention merely comprises one bearing point 4, 5 or more than two bearing points 4, 5. The transverse openings 6, 6' are additionally arranged off-centre, i.e. outside the longitudinal axis of the balancing shaft 1, as a result of which the balancing shafts 1 themselves have an unbalance in the region of the bearing points 4, 5, so that in particular neighbouring unbalance portions 2, 3 can be reduced with respect to their weight.

Considering the balancing shafts 1 according to the invention in accordance with the FIGS. 1 to 4, it is evident that the second part bearing surface 8 extends over a smaller circumference angle than the first part bearing surface 7. Optionally, the second part bearing surface 8 can also be designed shorter in axial direction of the balancing shaft 1, i.e. narrower seen in transverse direction than the first part bearing surface 7, as is shown for example with the balancing shafts according to the FIGS. 2a, 2b and 3a. An inverted embodiment, wherein the second part bearing surface 8 is wider than the first part bearing surface 7 is also conceivable, as is shown for example according to the FIGS. 1a-c. Usually, however, the size of the respective part bearing surface 7, 8 is adapted to the respective bearing loading to be absorbed, so that seen purely in terms of area, the first part bearing surface 7 is designed larger than the second part bearing surface 8, since the loading to be absorbed by the second part bearing surface 8 is smaller because of the lower unbalance weight there.

All balancing shafts 1 according to the invention have in common that the transverse openings 6, 6' are arranged outside the axial middle of the balancing shaft 1, as a result of which the unbalance weight assigned to the first part bearing surface 7 is significantly larger than the unbalance weight assigned to the second part bearing surface 8. In addition, all balancing shafts 1 are produced as one piece, i.e. monolithically out of a material, as a result of which the production can be rationalized. The second part bearing surface 8 in this case is held by two webs 9, 10 axially spaced from each other, which in turn each form a margin of the associated transverse opening 6, 6'. The two webs 9, 10 in this case can be designed in the manner of a semi-circle, as it is shown for example with the balancing shafts according to the FIGS. 1 to 3b or merely as pure radial webs, as is shown for example with the balancing shaft 1 according to FIG. 4. Because of this, a further weight reduction can be achieved. The transverse openings 6, 6' can be designed generally quadrilaterally, in particular rectangularly or trapezium-shaped or triangular in shape, as is shown for example with the balancing shafts 1 according to the FIGS. 2a and 2b. At a longitudinal end 11, the balancing shaft 1 can be connected in a rotationally fixed manner to a driving element, for example a toothed wheel which is not shown, so that the balancing shaft 1 is driven for example via a crankshaft of a combustion engine. Between the two bearing points 4, 5, a bulging steady rest application portion 12 can be additionally provided, which makes possible an avoiding of the balancing shaft 1 before a connecting rod that is not shown. In addition, the steady rest application portion 12 makes possible holding the balancing shaft 1, in particular upon a reworking of the latter.

Figure 2A:
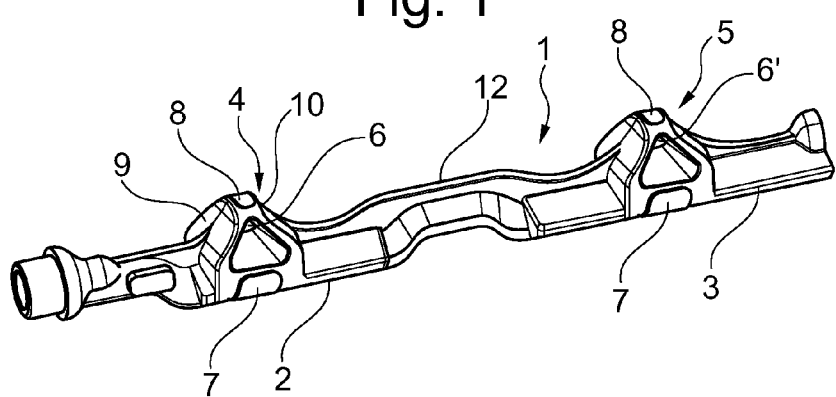
Figure 2B:
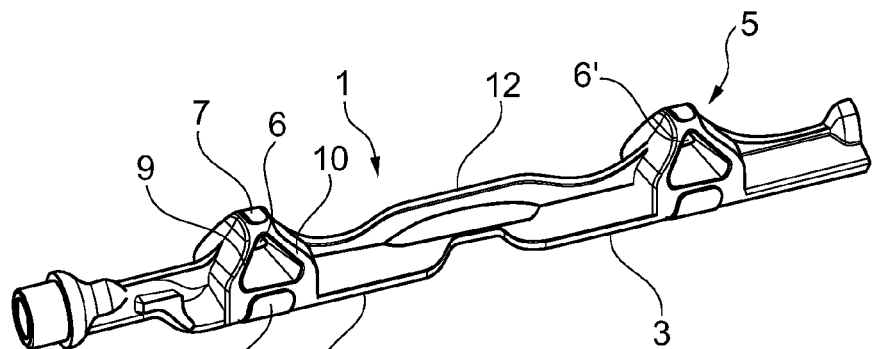
Figure 3A:
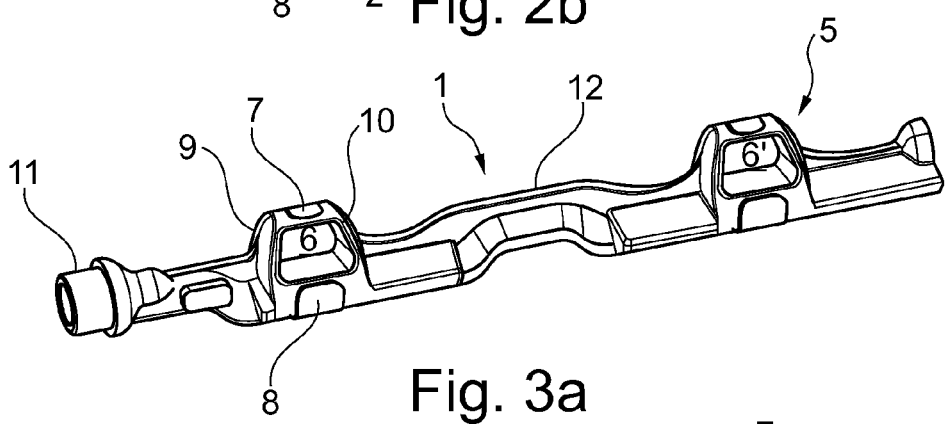
Figure 3B:
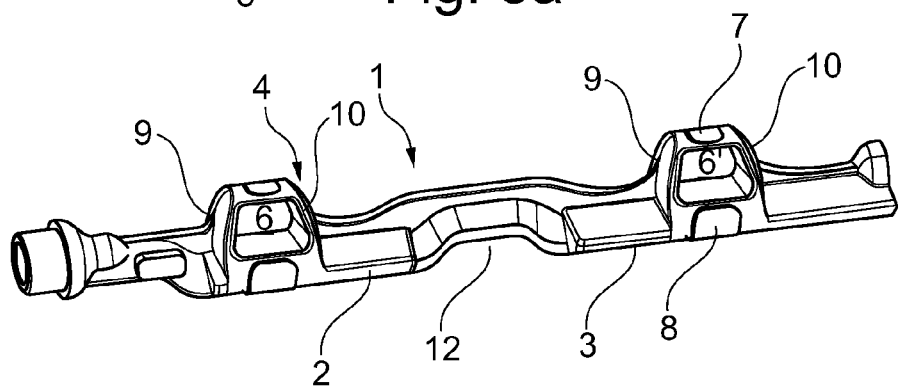
Figure 4:
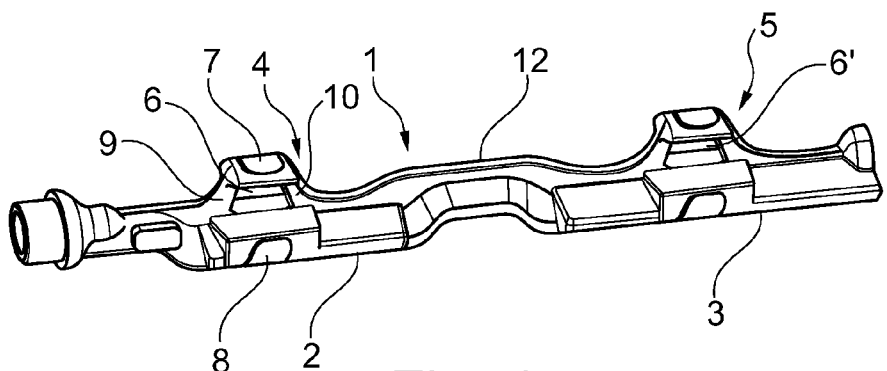

With respect to the balancing shafts 1 according to the invention in accordance with the FIGS. 2a and 2b, a significantly improved lubrication of the bearing points 4, 5 is also achieved here through the comparatively narrow second part bearing surface 8. As material for the balancing shafts 1 according to the invention, rolling bearing steel C56E2 is possible for example. The individual balancing shaft 1 according to the invention shown in the FIGS. 1 to 4 each of which are different, differ for example in the overall weight, in the diameter, in the density or in the mass radius.

Figure 5:
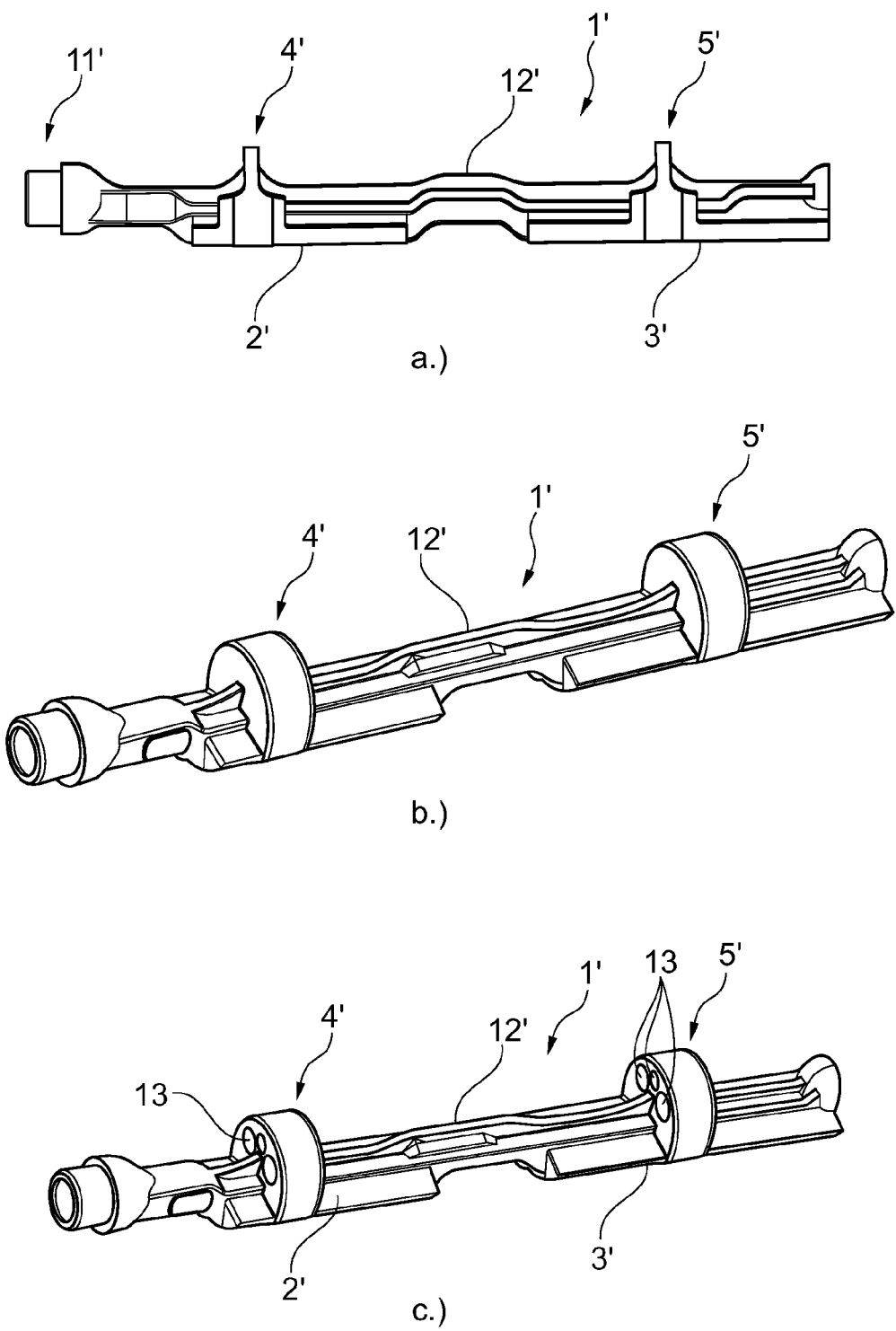

According to the FIGS. 5a-c, further embodiments of balancing shafts 1' are shown, but which are not subject to the invention and which have a continuous bearing surface in the region of the bearing points 4', 5'. The balancing shafts 1' shown according to the FIGS. 5a-c are likewise producible in a single forging step, but the die partition is rotated by 90°. The balancing shaft 1' according to FIG. 5c shows axial bores 13 in the region of the respective bearing point 4', 5' which are to reduce the weight in this region. Such a weight reduction is obviously also shown in the same manner with the balancing shaft 1' shown according to the FIG. 5a, wherein a bearing surface tapering in circumferential direction then expanding again makes possible a clearly improved lubrication of the bearing points 4', 5'.

With the balancing shaft 1 according to the invention, the latter cannot only be produced in a weight-reduced manner, which brings energetic advantages during the operation, but also designed simpler at the same time and thus produced more cost-effectively, in particular in a single forging step. Generally, the balancing shafts 1 according to the invention in this case serve to reduce or eliminate the free mass forces of a reciprocating piston engine in the known manner and because of this reduce the operating noise and the vibrations. The mass forces generated by the balancing shaft 1 counteract those of the crank drive. Depending on the type of the combustion engine, one or two balancing shafts 1 running with single or double crankshaft rotational speeds are used in most cases.

The invention claimed is:

1. A balancing shaft for a combustion engine comprising: at least one unbalance portion and at least one bearing point, wherein the at least one unbalance portion is associated with the at least one bearing point, and
   wherein the balancing shaft on the bearing point defines a transverse passage opening which separates a first part bearing surface from a second part bearing surface, the second part bearing surface extending over a smaller circumferential angle than the first part bearing surface.

2. The balancing shaft according to claim 1, wherein the balancing shaft is forged and the transverse passage opening runs parallel to a forging direction.

3. The balancing shaft according to claim 1, wherein the second part bearing surface is shorter in an axial direction of the balancing shaft than the first part bearing surface.

4. The balancing shaft according to claim 1, wherein the transverse passage opening is arranged outside an axial centre of the balancing shaft.

5. The balancing shaft according to claim 1, wherein the balancing shaft is produced from one piece.

6. The balancing shaft according to claim 1, wherein the second part bearing surface is held by two webs axially spaced from each other, wherein each of the two webs form a margin of the transverse passage opening.

7. The balancing shaft according to claim 6, wherein the two webs are each designed as a half disc.

8. The balancing shaft according to claim 1,
   wherein the balancing shaft at one end carries a driving element to be coupled to a toothed wheel on the crankshaft side,
   wherein the at least one bearing point includes two bearing points and the balancing shaft has a bulging steady rest application portion between the two bearing points, and
   wherein the transverse passage opening is at least one of a rectangular, triangular and trapezium-shaped design.

9. A combustion engine comprising: at least one balancing shaft having at least one unbalance portion and at least one bearing point, wherein the at least one unbalance portion is associated with the at least one bearing point, and
   wherein the balancing shaft on the bearing point defines a transverse passage opening which circumferentially separates a first part bearing surface from a second part bearing surface.

10. The combustion engine according to claim 9, wherein the balancing shaft is forged and the transverse passage opening runs parallel to a forging direction.

11. The combustion engine according to claim 9, wherein the second part bearing surface extends over a smaller circumference angle than the first part bearing surface.

12. The combustion engine according to claim 9, wherein the second part bearing surface is shorter in an axial direction of the balancing shaft than the first part bearing surface.

13. The combustion engine according to claim 9, wherein the transverse passage opening is arranged outside an axial centre of the balancing shaft.

14. The combustion engine according to claim 9 wherein the balancing shaft is produced from one piece.

15. The combustion engine according to claim 9, wherein the second part bearing surface is held by two webs axially spaced from each other, wherein each of the two webs form a margin of the transverse passage opening.

16. The combustion engine according to claim 15, wherein the two webs are each designed as a half disc.

17. The combustion engine according to claim 9, wherein that the balancing shaft at one end carries a driving element to be coupled to a toothed wheel on the crankshaft side,
   wherein the at least one bearing point includes two bearing points and the balancing shaft has a bulging steady rest application portion between the two bearing points, and
   wherein the transverse passage opening is at least one of a rectangular, triangular and trapezium-shaped design.

18. The balancing shaft according to claim 1, wherein the balancing shaft at one end carries a driving element to be coupled to a toothed wheel on the crankshaft side.

19. The balancing shaft according to claim 1, wherein the at least one bearing point includes two bearing points and the balancing shaft has a bulging steady rest application portion between the two bearing points.

20. A balancing shaft for a combustion engine, comprising:
   at least one unbalance portion and at least one bearing point, wherein the at least one unbalance portion is associated with the at least one bearing point; and
   wherein the at least one bearing point defines a transverse passage opening separating a first part bearing surface extending partially over a circumference of the bearing point from a second part bearing surface extending partially over the circumference of the bearing point.

21. The balancing shaft according to claim 20, wherein the second part bearing surface extends over a smaller circumference angle than the first part bearing surface.

22. The balancing shaft according to claim 20, wherein the second part bearing surface is shorter in an axial direction of the balancing shaft than the first part bearing surface.

23. The balancing shaft according to claim 20, wherein the transverse passage opening is arranged outside an axial centre of the balancing shaft.

24. The balancing shaft according to claim 20, wherein the second part bearing surface is held by two webs axially spaced from each other, wherein each of the two webs form a margin of the transverse passage opening.

25. The balancing shaft according to claim 24, wherein the two webs are each designed as a half disc.

26. The balancing shaft according to claim 20, wherein at least one of:
   the balancing shaft at one end carries a driving element to be coupled to a toothed wheel on the crankshaft side,
   wherein the at least one bearing point includes two bearing points and the balancing shaft has a bulging steady rest application portion between the two bearing points, and
   wherein the transverse passage opening is at least one of a rectangular, triangular and trapezium-shaped design.

* * * * *